United States Patent
Roy et al.

(10) Patent No.: US 7,842,757 B2
(45) Date of Patent: Nov. 30, 2010

(54) PIGMENT PREPARATION

(75) Inventors: Jamie MacLiver Roy, Leiden (NL); Hendrik Jan Willem Van Den Haak, Duiven (NL); Roger Francis Graham Brown, Darwen (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 138 days.

(21) Appl. No.: 12/089,356

(22) PCT Filed: Oct. 3, 2006

(86) PCT No.: PCT/EP2006/066985
§ 371 (c)(1), (2), (4) Date: Jul. 28, 2008

(87) PCT Pub. No.: WO2007/039603
PCT Pub. Date: Apr. 12, 2007

(65) Prior Publication Data
US 2009/0030139 A1    Jan. 29, 2009

Related U.S. Application Data

(60) Provisional application No. 60/749,039, filed on Dec. 12, 2005.

(30) Foreign Application Priority Data

Oct. 4, 2005 (EP) .................................. 05109206

(51) Int. Cl.
*C08F 8/30* (2006.01)
(52) U.S. Cl. ...................... 525/327.6; 523/351; 523/440
(58) Field of Classification Search .............. 525/327.6; 523/351, 440
See application file for complete search history.

(56) References Cited

U.S. PATENT DOCUMENTS

| | | | |
|---|---|---|---|
| 3,385,808 A | 5/1968 | Wulf von Bonin et al. | |
| 4,089,699 A | 5/1978 | Blackburn et al. | |
| 4,408,018 A | 10/1983 | Bartman et al. | |
| 5,169,894 A | 12/1992 | Holland et al. | |
| 5,364,909 A * | 11/1994 | Guo et al. | 525/69 |
| 5,589,534 A | 12/1996 | Metzger et al. | |
| 6,423,785 B1 * | 7/2002 | Esselborn et al. | 525/327.6 |
| 6,811,601 B2 | 11/2004 | Borzyk et al. | |
| 6,887,937 B1 | 5/2005 | Vandevoorde et al. | |
| 2001/0047071 A1 | 11/2001 | Van Dijk et al. | |
| 2002/0013404 A1 | 1/2002 | Buter et al. | |
| 2002/0016407 A1 | 2/2002 | Buter et al. | |
| 2004/0059048 A1 | 3/2004 | Jones et al. | |
| 2004/0186247 A1 | 9/2004 | Vandevoorde | |
| 2006/0000392 A1 * | 1/2006 | Reisacher et al. | 106/499 |

FOREIGN PATENT DOCUMENTS

| | | |
|---|---|---|
| EP | 1 026 178 | 8/2000 |
| EP | 1026178 A1 * | 8/2000 |
| EP | 1 565 531 | 8/2005 |
| WO | WO 96/14347 | 5/1996 |
| WO | WO 9614347 A1 * | 5/1996 |
| WO | WO 98/53013 | 11/1998 |
| WO | WO 01/92421 | 12/2001 |
| WO | WO 2004/046251 | 6/2004 |
| WO | WO 2004046251 A2 * | 6/2004 |

OTHER PUBLICATIONS

Search Report, European Application No. EP 05 10 9206, dated Sep. 15, 2006.
International Search Report, International Application No. PCT/EP2006/066985, mailed Apr. 20, 2007.

* cited by examiner

*Primary Examiner*—Satya B Sastri
(74) *Attorney, Agent, or Firm*—Kenyon & Kenyon LLP

(57) ABSTRACT

The invention relates to a solid pigment preparation comprising a pigment and a dispersant resin, wherein the composition comprises at least 35% by weight of at least one pigment and at most 65% by weight of dispersant resin, calculated on the combined weight of pigment and dispersant resin, wherein the dispersant resin comprises a polymer backbone produced by chain-reaction polymerization having pendent hydrophilic polyalkylene oxide side groups, and wherein the pigment particles within the preparation have average particle sizes in the range of 50 nm to 5,000 nm.

20 Claims, No Drawings

PIGMENT PREPARATION

REFERENCE TO RELATED APPLICATION(s)

This application is the U.S. National Phase of PCT/EP2006/066985 filed on Oct. 3, 2006 and claims the benefit of U.S. Provisional Application No. 60/749,039 filed on Dec. 12, 2005.

The invention relates to a solid pigment preparation comprising a pigment and a dispersant resin, to a process for preparing a pigment preparation, and to the use of a dispersant resin.

European patent EP 1026178 describes pumpable and flowable aqueous pigment preparations comprising a pigment and a dispersant resin, wherein the dispersant resin comprises a polymer backbone produced by chain-reaction polymerization having pendent hydrophilic polyalkylene oxide side groups. Also a solid pigment preparation is described, which requires dispersion, i.e. high shear force, for preparation of a liquid aqueous composition.

International patent application WO 96/14347 relates to a copolymer comprising alternating units of a vinyl monomer and a diester of a dicarboxylic acid in which at least one of the esterifying groups comprises a polyether group, said copolymer having an acid value of less than one. Liquid pigment dispersions containing the copolymer and coating compositions formulated with the dispersions are also described.

The known liquid pigment preparations generally have to be formulated with further adjuvants, such as dried-crust inhibitors, freeze resistance enhancers, thickeners, and anti-skinning agents, for stabilization. Aqueous based pigment preparations are not generally suitable for solvent borne coating compositions. The presence of organic co-solvents in liquid pigment preparations is undesirable, as these co-solvents introduce volatile organic compounds into water borne coating compositions. The solid powdery pigment preparations described in EP 1026178 cannot be introduced into paint formulations directly without an extra dispersion step. Thus, they are not suitable as stir-in pigments. Stir-in pigment preparations are frequently dry, generally powdery pigment concentrates comprising a pigment and a dispersing agent which can be incorporated into a matrix, such as a coating composition, by simple stirring without the need of an additional dispersing step, hence the name stir-in pigment preparation.

There is a need for novel pigment preparations which are comparable to the liquid formulations with regard to colour properties and dispersibility, but which do not require the additional adjuvants mentioned and are easier to handle. Accordingly, the invention seeks to provide a pigment preparation comprising a pigment and a dispersant resin which can be used as a stir-in pigment preparation, leading to a paint with stably dispersed pigments. The pigment preparation should be easy to incorporate into coating compositions in which the pigments are stably dispersed. In addition, it should be possible to prepare the pigment preparation with a wide range of pigments. The pigment preparation should allow the preparation of paint having excellent properties and stability, especially in the case of difficult-to-disperse-and-stabilize pigments. The pigment preparation should be suitable for the pigmentation of water borne as well as solvent borne coating compositions.

The invention now provides a solid pigment preparation comprising a pigment and a dispersant resin, wherein the composition comprises at least 35% by weight of at least one pigment and at most 65% by weight of dispersant resin, calculated on the combined weight of pigment and dispersant resin, wherein the dispersant resin comprises a polymer backbone produced by chain-reaction polymerization having pendent hydrophilic polyalkylene oxide side groups, and wherein the pigment particles within the preparation have average particle sizes in the range of 50 nm to 5,000 nm.

It should be noted that U.S. Pat. No. 3,385,808 describes free-flowing, non-aqueous, finely divided combinations for colouring plastics. The combinations are composed of 10-80% by weight of a pigment and 90-20% by weight of a graft polymer prepared by radical polymerization of a polymerizable vinyl compound and a polyalkylene oxide. The polymerizates are produced by grafting polymerizable vinyl compounds on polyalkylene oxides. The grafting reaction produces a resin comprising a hydrophilic polyalkylene oxide backbone having pendent polymer side groups produced by chain-reaction polymerization.

The pigment preparation of the invention can be used as stir-in pigment, i.e. it can be easily incorporated into coating compositions in which the pigments are stably dispersed. In addition, it is possible to prepare the pigment preparation with a wide range of pigments. The pigment preparation allows the preparation of paint having excellent properties and stability, especially in the case of difficult-to-disperse-and-stabilize pigments. An additional advantage is that the pigment preparation is suitable for the pigmentation of water borne as well as solvent borne coating compositions.

The pigment preparation of the invention may comprise an inorganic or an organic pigment. Alternatively, the pigment preparation may comprise a plurality of different pigments, for example two or more inorganic pigments, two or more organic pigments, or a mixture of one or more inorganic pigments and one or more organic pigments.

As mentioned above, the pigment particles within the preparation are present in finely divided form, i.e. the average particle size is within the range of 50 nm to 5,000 nm. Preferably, the average particle size is at least 80 nm, more preferably at least 100 nm. It is preferable that the average particle size is at most 3,000 nm, more preferably at most 1,500 nm, and most preferably at most 1,000 nm. The average particle size of the pigment particles within the preparation can for example be determined by electron microscopy. Since the average particle size of the pigments within the preparation is essentially the same as the average particle size of the pigments after they are stirred into a liquid, it is also possible to mix the pigment preparation with a liquid medium and to determine the average pigment particle size by dynamic light scattering.

The organic pigments typically are organic chromatic and black pigments. Inorganic pigments can likewise be colour pigments (chromatic, black, and white pigments) and also luster pigments and the inorganic pigments typically used as fillers.

The following are examples of suitable organic colour pigments:

monoazo pigments:

C.I. Pigment Brown 25; C.I. Pigment Orange 5, 13, 36, 38, 64, 67, and 74; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247, and 251; C.I. Pigment Yellow 1, 3, 62, 65, 73, 74, 97, 120, 151, 154, 168, 181, 183, and 191; C.I. Pigment Violet 32;

diazo pigments:

C.I. Pigment Orange 16, 34, 44, and 72; C.I. Pigment Yellow 12, 13, 14, 16, 17, 81, 83, 106, 113, 126, 127, 155, 170, 174, 176, 180, and 188;

diazo condensation pigments:
C.I. Pigment Yellow 93, 95, and 128; C.I. Pigment Red 144, 166, 214, 220, 221, 242, and 262; C.I. Pigment Brown 23 and 41;
anthanthrone pigments:
C.I. Pigment Red 168;
anthraquinone pigments:
C.I. Pigment Yellow 147, 177, and 199; C.I. Pigment Violet 31;
anthrapyrimidine pigments:
C.I. Pigment Yellow 108;
quinacridone pigments:
Pigment Orange 48 and 49; C.I. Pigment Red 122, 202, 206, and 209; C.I. Pigment Violet 19;
quinophthalone pigments:
C.I. Pigment Yellow 138;
diketopyrrolopyrrole pigments:
C.I. Pigment Orange 71, 73 and 81; C.I. Pigment Red 254, 255, 264, 270, and 272;
dioxazine pigments:
C.I. Pigment Violet 23 and 37; C.I. Pigment Blue 80;
flavanthrone pigments:
C.I. Pigment Yellow 24;
indanthrone pigments:
C.I. Pigment Blue 60 and 64;
isoindoline pigments:
C.I. Pigments Orange 61 and 69; C.I. Pigment Red 260; C.I. Pigment Yellow 139 and 185;
isoindolinone pigments:
C.I. Pigment Yellow 109, 110, and 173;
isoviolanthrone pigments:
C.I. Pigment Violet 31;
metal complex pigments:
C.I. Pigment Red 257; C.I. Pigment Yellow 117, 129, 150, 153, and 177; C.I. Pigment Green 8;
perinone pigments:
C.I. Pigment Orange 43; C.I. Pigment Red 194;
perylene pigments:
C.I. Pigment Black 31 and 32; C.I. Pigment Red 123, 149, 178, 179, 190, and 224; C.I. Pigment Violet 29;
phthalocyanine pigments:
C.I. Pigment Blue 15, 15:1, 15:2, 15:3, 15:4, 15:6, and 16; C.I. Pigment Green 7 and 36;
pyranthrone pigments:
C.I. Pigment Orange 51; C.I. Pigment Red 216;
pyrazoloquinazolone pigments:
C.I. Pigment Orange 67; C.I. Pigment Red 251;
thioindigo pigments:
C.I. Pigment Red 88 and 181; C.I. Pigment Violet 38;
triarylcarbonium pigments:
C.I. Pigment Blue 1, 61 and 62; C.I. Pigment Green 1; C.I. Pigment Red 81, 81:1, and 169; C.I. Pigment Violet 1, 2, 3, and 27; C.I. Pigment Black 1 (aniline black); C.I. Pigment Yellow 101 (aldazine yellow); C.I. Pigment Brown 22.

Examples of suitable inorganic colour pigments are:
white pigments:
titanium dioxide (C.I. Pigment White 6), zinc white, pigment grade zinc oxide; zinc sulfide, lithopone;
black pigments:
iron oxide black (C.I. Pigment Black 11), iron manganese black, spinel black (C.I. Pigment Black 27); carbon black (C.I. Pigment Black 7);
chromatic pigments:
chromium oxide, chromium oxide hydrate green; chrome green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt violet; manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red; brown iron oxide (C.I. Pigment Brown 6 and 7), mixed brown, spinel phases and corundum phases (C.I. Pigment Brown 29, 31, 33, 34, 35, 37, 39, and 40), chromium titanium yellow (C.I. Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminium oxide, aluminium hydroxide, natural micas, natural and precipitated chalk, talc, clay, and barium sulfate.

Luster pigments are platelet-shaped pigments having a monophasic or polyphasic construction the colour play of which is marked by the interplay of interference, reflection, and absorption phenomena. Examples are aluminium platelets and aluminium, iron oxide, and mica platelets bearing one or more coats, especially of metal oxides.

As mentioned above, the pigment preparation of the invention comprises as essential ingredients a pigment and a dispersant resin, wherein the composition comprises at least 35% by weight of at least one pigment and at most 65% by weight of dispersant resin, calculated on the combined weight of pigment and dispersant resin. When the pigment in the preparation is carbon black, it is preferred that the content of carbon black in the pigment preparation is in the lower part of the described range. Thus, when the pigment is carbon black, the pigment preparation preferably comprises at least 40% by weight, more preferably at least 45% by weight of carbon black, and at most 60% by weight, preferably at most 55% by weight of dispersant resin, calculated on the combined weight of pigment and dispersant resin. With other pigments, the pigment preparation generally comprises at least 60% by weight, preferably at least 64% by weight, more preferably at least 68% by weight, and most preferably at least 70% by weight of at least one pigment, and at most 40% by weight, preferably at most 36% by weight, more preferably at most 32% by weight, and most preferably at most 30% by weight of dispersant resin, calculated on the combined weight of pigment and dispersant resin. In a particularly preferred embodiment, the above-mentioned weight ratios of pigment and dispersant resin also apply when calculated on the total weight of the pigment preparation.

The pigment preparation may further comprise other ingredients, additives or auxiliaries commonly used in pigment preparations, such as wetting agents, anti-foaming agents, heat stabilizers, light stabilizers, antioxidants, and other pigment dispersion aids and/or surfactants. Fatty ethoxylates may be specifically mentioned as suitable surfactants which may additionally be present in the pigment preparation. Fatty ethoxylates are fatty acid, fatty alcohol, fatty amine, or fatty amide based ethoxylates. They have been found to have the potential to further improve the stir-in properties of the pigment preparations, such as the speed of colour generation and the colour strength. An example of a suitable fatty ethoxylate is Bermodol® SPS2525, a coco monoethanolamide ethoxylate ex Akzo Nobel Surface Chemistry. The fatty ethoxylates may be present in amounts similar to or even exceeding the amount of dispersant resin.

In one embodiment, the pigment preparation of the invention is a free-flowing powder which is suitable for use as a stir-in pigment. Also solid compacted pigment preparations can be used, for example in the form of pellets or tablets.

The polymer backbone of the dispersant to be used in the pigment preparation and process according to the invention can be prepared by chain-reaction polymerization of suitable ethylenically unsaturated polymerizable monomers.

An example of a suitable chain-reaction polymerization is the well-known free-radical polymerization of the above-mentioned olefinically unsaturated polymerizable monomers. The polymerization can be carried out in one or more stages and in the absence or presence of an organic diluent.

Suitable radical-forming initiators are known in the art, such as di-tert.-butyl peroxide, tert.-butyl peroxy benzoate, tert.-butyl peroxy-2-ethyl hexanoate, tert.-butyl peroxy-3,5,5-trimethyl hexanoate, and the like, and azo initiators such as 2,2'-azo-bis(2-methylbutyronitrile) and 2,2'-azo-bis(isobutyronitrile).

The molecular weight of the polymers can be controlled by chain transfer agents such as n-octyl mercaptan, n-dodecyl mercaptan, tert.-dodecyl mercaptan, mercapto ethanol, mercapto propionic acid, or thioglycol.

The degree of polymerization of the polymer backbone, i.e. the average number of monomers per polymer backbone, suitably is in the range of 5 to 150, preferably 10 to 100, and more preferably 15 to 50.

Advanced polymerization techniques, such as group transfer polymerization (GTP), nitroxide-mediated polymerization (NMP), atom transfer radical polymerization (ATRP), and reversible addition fragmentation chain transfer (RAFT) polymerization, can also be used for the preparation of the polymer backbone.

Suitable monomers for the preparation of the polymer backbone are ethylenically unsaturated polymerizable monomers. Suitable examples of such monomers are esters of acrylic or methacrylic acid having 1 to 18 carbon atoms in the alcohol part, such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, n-octyl (meth)acrylate, n-decyl (meth)acrylate, isodecyl (meth)acrylate, lauryl (meth)acrylate, 2-ethylhexyl (meth)acrylate, 3,5,5-trimethyl cyclohexyl (meth)acrylate, t-butyl cyclohexyl (meth)acrylate, isobornyl (meth)acrylate, stearyl (meth)acrylate, (meth)acrylates with ether groups such as 2-methoxyethyl (meth)acrylate, 2-ethoxyethyl (meth)acrylate, and 3-methoxypropyl (meth)acrylate; 2-hydroxybutyl (meth)acrylate, 3-hydroxybutyl (meth)acrylate or, preferably, 2-hydroxyethyl (meth)acrylate, 2-hydroxypropyl (meth)acrylate, 3-hydroxypropyl (meth)acrylate, and 4-hydroxybutyl (meth)acrylate, (meth)acrylic acid, ethacrylic acid, β-carboxyethyl acrylate, crotonic acid, maleic acid, fumaric acid, itaconic acid, citraconic acid, monoalkyl esters of unsaturated dibasic acids, such as maleic acid, itaconic acid, and citraconic acid; other methacrylates such as dimethyl aminoethyl methacrylate, glycidyl (meth)acrylate, 2-acetoacetoxyethyl methacrylate, and 3-(trimethoxysilyl)-propyl methacrylate. Further suitable monomers are esters of β-carboxyethyl acrylate and crotonic acid having 1 to 18 carbon atoms in the alcohol part, and (cyclo)alkyl esters of unsaturated dicarboxylic acids with 1 to 12 carbon atoms in the (cyclo)alkyl groups such as diethyl maleate and dibutyl fumarate, di(cyclo)alkyl itaconates, and di(cyclo)alkyl citraconates.

Other suitable ethylenically unsaturated monomers include vinyl aromatic compounds such as styrene, α-methyl styrene, o-, m- or p-methyl styrene, and tert.-butyl styrene; maleic anhydride, itaconic anhydride, citraconic anhydride, acrylamide, methacrylamide, acrylonitrile, N-alkoxy acrylamides, N-alkoxy methacrylamides; vinyl esters of $C_1$-$C_{18}$ monocarboxylic acids such as vinyl acetate, vinyl propionate, vinyl isobutyrate, vinyl esters of α-branched $C_5$-$C_{18}$ monocarboxylic acids. Other suitable vinyl monomers include vinyl chloride, vinylidene chloride, vinyl pyrrolidone, and vinyl silanes such as vinyl trimethoxy-silane and vinyl triethoxysilane.

The polymer backbone can also contain minor amounts up to about 10% of polymerized units of polyunsaturated monomers such as allyl methacrylate, ethylene glycol dimethacrylate, hexanediol diacrylate, trimethylol propane triacrylate, and the like.

The dispersant resin has at least one polyalkylene oxide side group pending from the polymer backbone. It is preferred that the dispersant resin has two or more pending polyalkylene oxide side groups. Dispersant resins having 3 to 20 polyalkylene oxide side groups are particularly suitable. Typically, the number of pendent polyalkylene oxide side groups does not exceed 100. In a typical embodiment, the polymer backbone of the resin is essentially linear, having pendent hydrophilic polyalkylene oxide side groups. Such polymers may also be described as comb polymers.

The at least one pendent hydrophilic polyalkylene oxide side group can be introduced by using monomers having at least one polyalkylene oxide group in the polymerization reaction. Examples of such monomers are poly(ethylene glycol) methyl ether acrylate and poly(ethylene glycol) methyl ether methacrylate.

Alternatively, it is possible to introduce the at least one pendent hydrophilic polyalkylene oxide group in a post-polymerization reaction, i.e. to first prepare the polymer backbone and subsequently graft the at least one pendent hydrophilic polyalkylene oxide group to the backbone. In this case, monomers having suitable functional groups for a post-polymerization reaction are preferably included in the polymer backbone. Examples of such functional groups are hydroxyl groups, acetoacetoxy groups, carboxylic acid groups, cyclic carboxylic anhydride groups, isocyanate groups, epoxide groups, and the like. Cyclic carboxylic anhydride groups are particularly preferred. Examples of ethylenically unsaturated polymerizable monomers comprising cyclic carboxylic anhydride groups are maleic anhydride, itaconic anhydride, and citraconic anhydride, maleic anhydride being preferred. Copolymers of maleic anhydride and styrene are particularly preferred polymer backbones.

For the introduction of the at least one pendent hydrophilic polyalkylene oxide group by a post-polymerization reaction it is particularly suitable to prepare the pigment dispersant resin by the reaction of
(i) a hydrophilic polyalkylene oxide monoamine monoalkylether of the formula

(I)

wherein R is an alk(en)yl radical or preferably hydrogen, $R^1$ is selected from $C_1$ to $C_4$ alkyl groups, n is 0 to 25, m is 1 to 50, with the proviso that n+m≦50, and (ii) a polymer backbone having cyclic carboxylic anhydride groups.

Examples of suitable monoamine compounds according to formula (I) are polyalkylene oxide based amines, which are commercially available from Huntsman under the trade designation Jeffamine® M.

The hydrophilic polyalkylene oxide monoamine monoalkylether reacts with the cyclic carboxylic anhydride groups of the polymer backbone. In that reaction the cyclic carboxylic anhydride is first opened by the amine group of the hydrophilic polyalkylene oxide monoamine monoalkylether to form an amide group and a carboxylic acid group (amic acid group). In this stage, hydrophilic polyalkylene oxide groups are already linked to the polymer backbone and the product can be used as a dispersant resin in the pigment preparation of the invention. When R in formula (I) is hydrogen, the amic acid group can also undergo a condensation reaction in a second reaction step to form an imide. It is preferred that at least part of the amic acid group forms an imide.

The polyalkylene oxide content of the dispersant resin suitably is at least 20% by weight, preferably at least 35% by weight, more preferably at least 50% by weight, and most preferably at least 65% by weight, calculated on the total weight of the dispersant resin. A suitable upper limit for the polyalkylene oxide content of the dispersant resin is 95% by weight, preferably 90% by weight, and more preferably 85% by weight, calculated on the total weight of the dispersant resin.

Examples of suitable alkylene oxides are ethylene oxide, propylene oxide, and butylene oxide. It is preferred that the polyalkylene oxide based side groups are based on ethylene oxide or propylene oxide or mixtures thereof. So far very good results have been obtained with polyalkylene oxide based side groups at least 50% by weight, preferably 70% by weight of which is based on ethylene oxide, calculated on the total weight of the polyalkylene oxide based side group. The polyalkylene oxide based side groups generally have a molecular weight of at least 200, preferably at least 350, and most preferably at least 700. The molecular weight of the polyalkylene oxide based side groups generally does not exceed 4,000, preferably it does not exceed 3,000.

The dispersant resin optionally comprises ionic groups. Examples of the ionic groups are anionic groups, such as base neutralized acidic groups, and cationic groups, such as acid neutralized basic groups. Ionic groups can be introduced by using suitable monomers in the preparation of the polymer backbone. Examples of suitable monomers are carboxylic acid and/or carboxylic anhydride functional monomers, such as acrylic acid and maleic anhydride.

If the polyalkylene oxide content of the dispersant resin is at the lower end of the range described above, the presence of ionic groups is particularly preferred in order to ensure the desired properties of the pigment preparation. The acid value of the dispersant resin, calculated as the sum of neutralized and non-neutralized acidic groups, suitably is in the range of 0 to 200 mg KOH/g, calculated on non-volatile matter of the dispersant resin. Preferably, the acid value is at least 5 mg KOH/g, more preferably at least 15 mg KOH/g. It is preferred that the acid value is below 150 mg KOH/g, more preferably below 100 mg KOH/g, and most preferably below 50 mg KOH/g.

The number average molecular weight of the dispersant resin suitably is at least 1,500, preferably at least 3,000, more preferably at least 8,000, and most preferably at least 12,000. The number average molecular weight of the dispersant resin suitably is below 150,000, preferably below 100,000, more preferably below 60,000, and most preferably below 40,000.

The invention further relates to a process for the preparation of a pigment preparation comprising the steps of
 a) stirring a pigment and a dispersant resin, optionally with added water or organic diluent, to form a fluidized pigment slurry,
 b) optionally, milling the slurry, and
 c) drying the slurry,
wherein the dispersant resin comprises a polymer backbone produced by chain-reaction polymerization having pendent hydrophilic polyalkylene oxide side groups.

As mentioned above in respect of the pigment preparation, the pigment used in the process can be an organic or an inorganic pigment. It is also possible to use a mixture of pigments, for example a mixture of two or more inorganic pigments, a mixture of two or more organic pigments, or a mixture of inorganic and organic pigments. It is possible to use a large variety of pigments in the process. The pigments can be introduced into the process as standard dried pigments. The milling step serves to break up agglomerates and to achieve the required pigment particle size. Organic pigments are also available as so-called press cakes. Organic pigments, when synthesized, are in the form of very small crystals, called primary particles. The aim of pigment synthesis is to produce primary particles of a size that optimizes pigment application properties such as colour strength, tone and brightness, transparency and opacity, and flow properties. The press cake contains the pigment essentially in this disaggregated form. Hence, less energy is required to break up agglomerates and to achieve the required pigment particle size. During drying of the pigment press cake in the absence of dispersant resin, primary particles will join together to form aggregates and agglomerates. Therefore, when an organic pigment is used in the process, it is possible and preferred to use the organic pigment in the form of a pigment press cake. When pigment press cakes are used, simple stirring of the fluidized pigment slurry may be sufficient to achieve the required pigment particle size. Milling of the slurry may be redundant in such cases.

When additional liquid is required to fluidize the mixture of pigment and dispersant resin, it is preferred that the liquid is water. Instead of water or in addition to water organic solvents may be used, such as glycols or glycol ethers, for example ethylene glycol or higher homologues thereof or ethylene glycol mono-n-butyl ether.

The optional milling step can be carried out using well-known milling equipment usually employed for breaking down the particle size of pigments. Examples of suitable equipment for carrying out the process are bead mills, jet mills, ultrasonic mills, basket mills, roll mills, and high-speed dissolvers. Milling is generally continued until the average particle size is within the range of 50 nm to 5,000 nm. Preferably, the average particle size is at least 80 nm, more preferably at least 100 nm. It is preferable that the average particle size is at most 3,000 nm, more preferably at most 1,500 nm, and most preferably at most 1,000 nm.

Examples of suitable methods of drying are spray granulation and fluidized bed drying, spray-drying, drying in a paddle dryer, evaporation and subsequent comminution, and freeze-drying. The selected method of drying may influence the particle size of the pigment preparations of the present invention. The drying step is preferably carried out by freeze-drying or by spray-drying.

Spray and fluidized bed granulation can produce coarsely divided granules having average particle sizes from 50 to 5,000 μm and especially from 100 to 1,000 μm. Depending on the process conditions, spray-drying can also produce finely divided pigment preparations. Spray-drying can produce granules having average particle sizes <20 μm. Finely divided preparations are also obtainable by drying in a paddle dryer and by evaporation with subsequent grinding.

The residual moisture content of the dried pigment preparation obtained can vary significantly. The residual moisture content may for example be 15% by weight, calculated on the weight of the total pigment preparation. Generally, the residual moisture content does not exceed 15% by weight, preferably it does not exceed 12% by weight. In many cases, the residual moisture content is even less than 5% by weight. When the pigment preparation is intended for use in non-aqueous systems, a low residual moisture content is particularly preferred, for example less than 2% by weight.

The pigment preparations of the present invention are notable in use for their excellent colour properties, especially with regard to colour strength, brilliance, hue and hiding power, and especially for their stir-in characteristics, i.e. they can be dispersed in application media with a minimal input of energy, simply by stirring or shaking.

The pigment preparations of the present invention additionally have the following advantages: they have a high pigment content, exhibit very good stability in storage, are both economically and ecologically advantageous with regard to packaging, storage, and transportation, and they are more flexible in use, i.e. they can be used for pigmenting water borne compositions as well as solvent borne compositions.

The pigment preparations of the present invention are very useful for pigmenting macromolecular organic and inorganic materials of any kind. Liquid application media in this context can be purely aqueous, comprise mixtures of water and organic solvents, for example alcohols, or be based exclusively on organic solvents, such as alcohols, glycol ethers, ketones, e.g. methylethyl ketone, amides, e.g. N-methyl pyrrolidone and dimethyl formamide, esters, e.g. ethyl acetate, butyl acetate, and methoxypropyl acetate, or aromatic or aliphatic hydrocarbons, e.g. xylene, mineral oil, and mineral spirits.

Examples of materials which can be pigmented with the pigment preparations of the present invention include: coatings, for example architectural coatings, industrial coatings, automotive coatings, radiation-curable coatings; powder coatings; paints, including paints for building exteriors and building interiors, for example wood paints, lime washes, distempers, emulsion paints; solvent borne printing inks, for example offset printing inks, flexographic printing inks, toluene intaglio printing inks, textile printing inks, radiation-curable printing inks; water borne inks, including inkjet inks; colour filters; building materials (water is typically added only after the building material and the pigment preparation have been dry-mixed), for example silicate render systems, cement, concrete, mortar, gypsum; bitumen, caulks; cellulosic materials, for example paper, paperboard, cardboard, wood, and woodbase, which can each be coated or otherwise finished; adhesives; film-forming polymeric protective colloids as used for example in the pharmaceutical industry; cosmetic articles; plastics; and detergents.

The pigment preparations of the present invention are particularly useful as mixing components in colour-mixing or -matching systems. Owing to their stir-in characteristics, they can be used directly as a solid for this purpose. If desired, however, they may also be first converted into base colours, mixing varnishes, and tinting colours (especially into colours having a high solids content, "HS colours"), or even more highly pigmented tinting pastes, which then constitute the components of the mixing system. The matching of the desired hue and hence the mixing of the colour components can be effected visually via a system of colour cards in a very large number of hue gradations based on colour standards, such as RAL, BS, and NCS, or preferably under computer control, whereby an unlimited number of hues become accessible ("computer colour matching"). A process for preparing a pigmented coating composition comprises mixing with stirring, in any workable order, the pigment preparation of the present invention, at least one film-forming binder, and at least one liquid diluent.

EXAMPLES

Raw Materials Used

| | |
|---|---|
| SMA 2000 ® | Copolymer of styrene and maleic anhydride having a molecular weight of about 2,500, the molar ratio of styrene/maleic anhydride being 2/1, ex Cray Valley |
| Jeffamine ® M 2070 | Polyalkylene oxide based amine ex Huntsman |
| Irgazin ® DPP Red BO | Red pigment ex Ciba |
| Autowave ® | Water borne modular base coat system ex Akzo Nobel Car Refinishes |
| Autowave ® 665 | Clear base module of Autowave comprising a blend of polyurethane and acrylic resin dispersion ex Akzo Nobel Car Refinishes |
| Autowave ® 666 | Clear base module of Autowave comprising an acrylic resin dispersion ex Akzo Nobel Car Refinishes |
| Autowave ® 357 | Red toner module of Autwave ex Akzo Nobel Car Refinishes |
| Autowave ® 00 | White toner module of Autowave ex Akzo Nobel Car Refinishes |
| Autocryl ® LV | Two-component topcoat ex Akzo Nobel Car Refinishes |
| Autocryl ® Plus | Two-component topcoat ex Akzo Nobel Car Refinishes |

General Methods:

The solids content of compositions was determined by measuring the weight loss after heating a sample to 140° C. for 30 minutes.

The molecular weights were determined by size exclusion chromatography using polystyrene as standard.

The gloss was determined with a Byk-Gardner gloss meter and the results are reported in gloss units.

Chroma (C*) values were determined according to the CIE LCh system.

Example 1

Preparation of a Dispersant Resin Having a Polymer Backbone and Pendent Hydrophilic Polyalkylene Oxide Side Groups In a reaction vessel fitted with a stirrer, a thermocouple, a heating jacket, a reflux condenser, and a dropping funnel were placed 20.3 parts by weight of SMA 2000® and 79.7 parts by weight of Jeffamine® M 2070. The mixture was heated to 180° C. under vacuum. Reaction water was distilled off and the reaction was continued at 180° C. until the acid value was below 30 mg KOH/g. Thereafter, the reaction mixture was allowed to cool to room temperature. The dispersant resin was soluble in water, had an acid value of 28.0 mg KOH/g (calculated on non-volatile-matter), a number average molecular weight of 17,100, and a weight average molecular weight of 43,000.

Example 2

Preparation of a Pigment Preparation According to the Invention

A mixture of 33.5 parts by weight of a 40% aqueous solution of the dispersant resin of Example 1, 20.1 parts by weight of demineralized water, 0.3 parts by weight of a commercially available antifoaming agent, 0.5 parts by weight of dimethyl ethanolamine, and 45.6 parts by weight of Irgazin® DPP Red BO pigment was prepared.

The mixture was bead-milled on a 7-liter scale using an ECM-pilot mill and the pigment dispersion was given a total of 75 passes using 0.7-0.9 mm beads. The average particle size was 170 nm.

The samples were spray-dried in a Büchi mini spray-dryer with 132° C. inlet temperature and 85° C. outlet temperature, the flow was 0.2 kg/hr. No apparent clogging of the nozzle or pressure build-up was noticed. The powdery pigment preparation was dried to around 1% residual moisture and the pigment content was calculated to be 76.8%. The finished pigment preparation was a free-flowing dry powder.

Examples 3 to 10 and Comparative Examples A to F

Preparation of Coating Compositions

The pigment preparation of Example 2 was tested as stir-in pigment in two different water borne binder systems, Autowave® 665 (Example 3) and Autowave® 666 (Example 4), and in two different solvent borne binder systems, Autocryl® Plus (Example 5) and Autocryl® LV (Example 6). An IKA RW20 stirrer with 4 cm stirrer blade operating at 750-760 rpm was used for the tests. The pigment preparation of Example 2 was added under stirring and then maintained at the set speed for a total of 30 minutes. Sufficient pigment preparation was added to give coating compositions having a pigment content of 6.6% by weight (Examples 3 and 4), 9.58% by weight (Example 5), and 11.76% by weight (Example 6). These pigment contents are identical to those of the Comparative Examples used as references:

Comparative Example A: Autowave® 357 toner, reference for Examples 3 and 4

Comparative Example B: Autocryl® Plus colour A273, reference for Example 5

Comparative Example C: Autocryl® LV colour S273, reference for Example 6

The finished coating compositions had excellent fineness of grind values and no particles were apparent in a Hegmann gauge test.

White reductions were prepared by mixing the coating compositions with white toners:

Example 7

The coating composition of Example 3 was mixed with white toner module Autowave® 00 so that the weight ratio of red pigment to white pigment in the resulting mixture was 50:50.

Example 8

The coating composition of Example 4 was mixed with white toner module Autowave® 00 so that the weight ratio of red pigment to white pigment in the resulting mixture was 50:50.

Comparative Example D

The coating composition of Comparative Example A was mixed with white toner module Autowave® 00 so that the weight ratio of red pigment to white pigment in the resulting mixture was 50:50.

Example 9

The coating composition of Example 5 was mixed with white toner module Autocryl® Plus A110 so that the weight ratio of red pigment to white pigment in the resulting mixture was 50:50.

Comparative Example E

The coating composition of Comparative Example B was mixed with white toner module Autocryl® Plus A110 so that the weight ratio of red pigment to white pigment in the resulting mixture was 50:50.

Example 10

The coating composition of Example 6 was mixed with white toner module Autocryl® LV S110 so that the weight ratio of red pigment to white pigment in the resulting mixture was 50:50.

Comparative Example F

The coating composition of Comparative Example C was mixed with white toner module Autocryl® Plus S110 so that the weight ratio of red pigment to white pigment in the resulting mixture was 50:50.

The coating compositions were applied on Leneta Form 2A opacity cards using a K-Control Coater (Bar 0.4, Speed 3) and left to dry at room temperature overnight. Examples 5, 6, 9, 10, and B, C, E, and F were mixed with Autocryl® LV hardener 420 in a 2:1 volume ratio prior to application.

The results are summarized in Table 1.

| Example | Stir-in properties | Gloss (60°) | Gloss (20°) | Chroma (C*) |
|---|---|---|---|---|
| A | not applicable | 64.2 | 14.4 | 69.45 |
| 3 | excellent | 79.0 | 49.6 | 73.55 |
| 4 | excellent | 79.3 | 51.0 | 73.60 |
| B | not applicable | 92.8 | 85.1 | 76.13 |
| 5 | good | 93.3 | 86.2 | 75.49 |
| C | not applicable | 91.7 | 84.8 | 75.80 |
| 6 | good | 91.8 | 85.0 | 75.59 |
| D | not applicable | 65.8 | 18.9 | 63.24 |
| 7 | not applicable | 73.2 | 34.5 | 60.42 |
| 8 | not applicable | 80.4 | 47.0 | 62.06 |
| E | not applicable | 92.8 | 86.6 | 58.44 |
| 9 | not applicable | 92.4 | 84.4 | 60.52 |
| F | not applicable | 91.5 | 84.7 | 57.63 |
| 10 | not applicable | 91.1 | 82.7 | 62.26 |

The full tone colour properties were good in all water borne base coat and solvent borne top coat coatings tested. The gloss in the water borne base coat and the solvent borne top coat was comparable to and in some cases better than in the references.

The chroma values for the water borne white reductions (Examples 7 and 8) were lower than in the reference (Comparative Example D) but nonetheless acceptable. Autocryl® Plus and LV chroma values are significantly higher than those for the reference systems. It can be concluded that pigment preparations according to the invention give excellent stir-in properties in water borne as well as solvent borne compositions.

The invention claimed is:

1. A solid pigment preparation in the form of granules, powder, pellets or tablets, the solid pigment preparation comprising pigment particles and a dispersant resin, wherein the preparation comprises at least 35% by weight of the pigment particles and at most 65% by weight of the dispersant resin, calculated on the combined weight of pigment particles and dispersant resin, wherein the dispersant resin comprises a polymer backbone produced by chain-reaction polymerization having pendent hydrophilic alkylene oxide side groups and wherein the pigment dispersant resin is prepared by the reaction of
   (i) a hydrophilic alkylene oxide monoamine monoalkylether of the formula

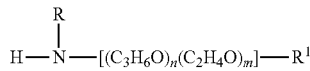
   (I)

wherein R is hydrogen, $R^1$ is selected from $C_1$ to $C_4$ alkyl groups, n is 0 to 25, m is 1 to 50, with the proviso that $n+m \leq 50$, and,
   (ii) a polymer backbone having cyclic carboxylic anhydride groups,
   wherein in a first reaction step the cyclic carboxylic anhydride is opened by the amine group of the hydrophilic alkylene oxide monoamine monoalkylether to form an amide group and a carboxylic acid group (amic acid group), and wherein at least part of the amic acid forms an imide in a second reaction step,
   wherein the pigment particles within the preparation have an average particle size in the range of 50 nm to 5,000 nm.

2. The pigment preparation according to claim 1, wherein the content of alkylene oxide in the dispersant resin is at least 20% by weight.

3. The pigment preparation according to claim 1, wherein the alkylene oxide is based on ethylene oxide, propylene oxide, or mixtures thereof.

4. The pigment preparation according to claim 1, wherein the number average molecular weight of the dispersant resin is in the range of 1,500 to 150,000.

5. The pigment preparation according to claim 1, wherein the dispersant resin has an acid value in the range of 5 to 150 mg KOH/g.

6. The pigment preparation according to claim 1, further comprising a fatty ethoxylate surfactant.

7. A process for preparing a solid pigment preparation in the form of granules, powder, pellets or tablets, the process comprising the steps of
   a) stirring a pigment and a dispersant resin to form a fluidized pigment slurry, and
   b) drying the slurry,
wherein the dispersant resin comprises a polymer backbone produced by chain-reaction polymerization having pendent hydrophilic alkylene oxide side groups wherein the pigment dispersant resin is prepared by the reaction of
   (i) a hydrophilic alkylene oxide monoamine monoalkylether of the formula

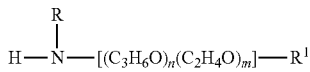
   (I)

wherein R is hydrogen, $R^1$ is selected from $C_1$ to $C_4$ alkyl groups, n is 0 to 25, m is 1 to 50, with the proviso that $n+m \leq 50$, and,
   (ii) a polymer backbone having cyclic carboxylic anhydride groups,
   wherein in a first reaction step the cyclic carboxylic anhydride is opened by the amine group of the hydrophilic alkylene oxide monoamine monoalkylether to form an amide group and a carboxylic acid group (amic acid group), and wherein at least part of the amic acid forms an imide in a second reaction step.

8. The process according to claim 7, wherein the pigment is an organic pigment provided in the form of a press cake.

9. The process according to claim 7, wherein step b) is carried out by freeze-drying or spray-drying.

10. A process for preparing a pigmented coating composition comprising mixing with stirring in any workable order
   a. the pigment preparation according to claim 1,
   b. at least one film-forming binder, and
   c. at least one liquid diluent.

11. A method of preparing a solid stir-in pigment preparation in the form of granules, powder, pellets or tablets, the method comprising adding a dispersant resin to a pigment wherein the dispersant resin comprises a polymer backbone produced by chain-reaction polymerization having pendent hydrophilic alkylene oxide side groups wherein the pigment dispersant resin is prepared by the reaction of
   (i) a hydrophilic alkylene oxide monoamine monoalkylether of the formula

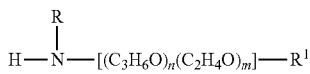
   (I)

wherein R is hydrogen, $R^1$ is selected from $C_1$ to $C_4$ alkl groups, n is 0 to 25, m is 1 to 50, with the proviso that $n+m \leq 50$, and,
   (ii) a polymer backbone having cyclic carboxylic anhydride groups,
   wherein in a first reaction step the cyclic carboxylic anhydride is opened by the amine group of the hydrophilic alkylene oxide monoamine monoalkylether to form an amide group and a carboxylic acid group (amic acid group), and wherein at least part of the amic acid forms an imide in a second reaction step.

12. The pigment preparation according to claim 2, wherein the alkylene oxide is based on ethylene oxide, propylene oxide, or mixtures thereof.

13. The pigment preparation according to claim 2, wherein the number average molecular weight of the dispersant resin is in the range of 1,500 to 150,000.

14. The pigment preparation according to claim 2, wherein the dispersant resin has an acid value in the range of 5 to 150 mg KOH/g.

15. The pigment preparation according to claim 12, wherein the dispersant resin has an acid value in the range of 5 to 150 mg KOH/g.

16. The pigment preparation according to claim 1, wherein the pigment preparation is in the form of powder, pellets or tablets.

17. The process according to claim 7, further comprising milling the slurry prior to step b) drying the slurry, and wherein water or organic diluent is also stirred in step a) to form the slurry.

18. The process according to claim 17, wherein the pigment is an organic pigment provided in the form of a press cake, and in that step b) is carried out by freeze-drying or spray-drying.

19. The process according to claim 8, wherein step b) is carried out by freeze-drying or spray-drying.

20. A process for preparing a pigmented coating composition comprising mixing with stirring in any workable order
 a. the pigment preparation according to claim 15,
 b. at least one film-forming binder, and
 c. at least one liquid diluent.

* * * * *